United States Patent Office 3,323,926
Patented June 6, 1967

3,323,926
FLUORESCENT GLASS AND METHOD OF MAKING IT
Thomas G. O'Leary, Corning, N.Y., assignor to Corning Glass Works, Corning, N.Y., a corporation of New York
No Drawing. Filed Oct. 10, 1966, Ser. No. 585,232
4 Claims. (Cl. 106—52)

This application is a continuation-in-part of my co-pending application, Ser. No. 373,507, filed June 8, 1964, now abandoned.

This invention relates to the manufacture of fluorescent glasses. More specifically, this invention relates to glasses which exhibit fluorescence when exposed to ultra-violet radiations of certain wave lengths.

The production of fluorescent lamps, face plates for television bulbs and cathode ray tubes, and like uses, is generally accomplished by laying down an adherent film or screen of material containing a fluorescent chemical or phosphor on a glass carrier body. Such coatings, being external to the glass, are subject to mechanical abuse and to atmospheric or other weathering media as well as to decay resulting from exposure to the activating source. This factor has fostered extensive research directed toward the development of a glass wherein the fluorescing component would be a part of and within the glass body itself. The demand for such glasses has resulted from the increased use of luminous devices for signs and, in particular, for point-of-purchase advertising displays. This type of advertising is exemplified in the sales displays utilized in restaurants, taverns, and the like, to indicate the various brands of beverages which can be purchased there. Fluorescent glasses are particularly advantageous for such advertising since the telltale deposit of phosphor on the surface of the display area is absent, thus maintaining an element of mystery involved in an image which disappears completely when the ultra-violet radiation is removed.

Numerous glasses have been developed over the years which exhibit a certain amount of fluorescence. Thus, glasses have been formulated containing uranium, thallium, and various metallic sulfides which can be caused to fluoresce upon exposure to ultra-violet light. However, these glasses have not enjoyed any substantial commercial success for a variety of reasons. In many instances, the fluorescence was too weak to be of any practical use. In others, the glass composition was so unstable that extreme care was needed in melting and forming the glass to retain the fluorescing ingredient in its effective state, this extreme care rendering the glass unstable for mass production methods. Finally some of the glasses employed fluorescing agents which were deleteriously affected by the minor impurities in the normal glass batch materials and required the use of extremely costly, high-purity starting materials, and therefore, were not economically practical.

Hence, the principal object of this invention is to produce a glass which will strongly fluoresce when exposed to ultra-violet radiations.

Another object of this invention is to produce such a glass without resorting to special melting and forming techniques.

Still another object of this invention is to produce a glass which exhibits preferential fluorescence, i.e., it exhibits fluorescence in certain areas only.

I have discovered that the objects of this invention can be accomplished through a special treatment of an alkali-silicate glass wherein silver is present. In the broadest terms, my invention comprises the melting of a glass-forming batch of the proper ingredients, cooling the melt to form a glass shape therefrom, and then heat treating this glass shape at a temperature between about 300°–450° C., while it is being exposed to ultra-violet radiations within the range 280–340 millimicrons (2800–3400 A.), for about 1–60 minutes. Such glasses then fluoresce strongly whenever they are subjected to ultra-violet radiations within the range of wave lengths of 300–400 millimicrons.

I have learned that glasses possessing the desired fluorescence can be made utilizing the method of the invention from glass-forming compositions consisting essentially, on a weight percent basis as calculated from the batch, of 35–70% $SiO_2$, 3–29% $R_2O$, wherein $R_2O$ consists of 0–20% $Li_2O$, 0–25% $Na_2O$, and 0–25% $K_2O$, and 0.2–1.0% Ag, the total of said $SiO_2$, $R_2O$, and Ag comprising at least 55% by weight of the compositions. The following modifying oxides may be present to improve various physical properties. Up to 25% by weight of $Al_2O_3$ may be included in the batch, its presence being advantageous in improving the stability of the glass and its chemical durability. Likewise, up to 15% by weight of $B_2O_3$ may also be included to improve the melting qualities of the glass. Its presence is particularly helpful when the alkali metal oxide content of the batch is low. Other compatible metal oxides, designated as RO, such as MgO, CaO, BaO, CdO, and ZnO may be included to a total of 5% by weight to make the glass more durable to chemical attack and atmospheric weathering. The addition of up to 0.02% by weight of CuO often acts to enhance the brightness of the fluorescence although glasses containing copper but no silver exhibit negligible fluorescence when treated in accordance with this invention. Minor amounts of fluorine may also be added as a melting aid and $CeO_2$ in amounts up to about 0.2% by weight appear to increase the brightness of the fluorescence in some instances. These glasses are generally quite fluid and no fining agent is usually required although in glasses having a low alkali metal oxide content up to 0.5% $Sb_2O_3$ may be added to advantage for this purpose. Finally, the addition of up to 0.005% by weight CoO or up to 0.05% by weight of NiO gives a slight gray tint to the glass which, because this contrast results in an apparent brightening of the fluorescence, produces an attractive image when used as a sign.

I have found the composition ranges set out above for the $SiO_2$, $R_2O$, and Ag to be critical to the invention. At least 35% $SiO_2$ is necessary to yield a glass possessing at least the minimum required durability and stability while amounts greater than 70% may result in devitrification of the melt as it is being cooled to a glass. Amounts between about 50–60% by weight are preferred. At least about 3% by weight of $R_2O$ is required to produce a glass which will exhibit fluorescence with Ag, while more than 29% by weight total $R_2O$ or more than the specified amount of any one of the components of the $R_2O$ constituent will yield a glass having such poor chemical durability that it will not be resistant to atmospheric moisture. At least 0.2% by weight of Ag must be present to produce the desired strong fluorescence but more than about 1% hazards the development of an opal phase as the melt is cooled to room temperature or such an opal phase may strike in as the glass is heated to 300°–450° C. in carrying out the simultaneously step of exposure to ultra-violet radiation and heat treatment.

The mechanism of fluorescence in these glasses is not fully understood but is believed to be founded upon the presence of colloidal silver of a particular particle size. Thus, merely melting a silver-containing glass batch under reducing conditions will not produce a strongly fluorescing glass, the reduced silver particles being postulated to be present in too few number and in too large particle size. I have theorized that the ultra-violet light acts to nucleate extremely small silver particles, perhaps atomic size. The low temperature heat treatment applied thereto causes these nuclei to grow to the proper size. Hence, the property of strong fluorescene is believed to be due to the presence of extremely numerous particles of colloidal silver of about atomic size which is brought about through the nucleating effect of ultra-violet radiation of the proper wave lengths, this nucleation resulting in a myriad of growth sites for colloidal silver which, when heat treated in accordance with this invention, develop into colloidal silver particles of the proper size. The colloidal silver image of the photosensitive glasses of commerce is also based upon this phenomenon of nucleation by ultra-violet radition but this image, produced by first exposing those glasses to ultra-violet radiation and then heating to temperatures higher than those contemplated here, is made up of particles much larger than those causing fluorescence. Whatever the mechanism involved, I have found that the exposure to ultra-violet radiation with the specified wave lengths of 280–340 millimicrons and heat treatment of the glasses of this invention must be simultaneous or the desired strong fluorescence will not result upon exposure to radiations of wavelengths between about 300–400 millimicrons.

In the general practice of my invention, a suitable batch is compounded, the ingredients thoroughly mixed together, and then melted at about 1350–1500° C. in crucibles, pots, or tanks, depending upon the amount of glass desired, for a time sufficient to obtain a homogeneous melt, usually about 4–6 hours. The melt is usually cast into the desired shape and then annealed although it will be apparent that any of the various glass forming techniques may be used such as drawing, pressing, spinning, rolling, etc. Commonly, the glass shape is cooled to room temperature to permit a visual inspection of the glass quality. The glass is then placed in a heating chamber and the temperature raised therein to 300°–450° C., the optimum temperature being 300°–350° C. for low melting glasses and 400°–450° C. for higher melting glasses, this heating chamber having a source of ultra-violet radiation of wave lengths between about 280–340 millimicrons within. The heating chamber is maintained within this temperature range for a period of time sufficient to develop the necessary colloidal silver particles of the proper size for fluorescence, generally about 1–60 minutes with about 20–30 minutes being preferred. Longer times of exposure and heat treatment may be utilized but no real improvement in the quality of fluorescence can be observed. The rate of heating the glass shape to 300–450° C. is dependent upon the size of the shape and the coefficient of thermal expansion of the glass. Where the thickness dimension of the shape is quite small, the shape may be plunged directly into the heating chamber, whereas with thick articles care should be taken in not heating them too rapidly so breakage occurs.

Table I records examples having compositions included within the effective ranges as calculated from the batch on the oxide basis in weight percent. In accordance with conventional analytical practice, although it is quite probable that a portion of the silver is present in the glass as ions thereof having bonds with oxygen or other ions and not as metallic silver, it is expressed in Table I as silver. The batch constituents may consist of any materials, either oxides or other compounds, which, on being fused together, are transformed to the desired oxide compositions in the necessary proportions. The silver is commonly added as a compound thereof rather than as metallic silver.

TABLE I

|  | 1 | 2 | 3 | 4 | 5 | 6 |
|---|---|---|---|---|---|---|
| $SiO_2$ | 60.7 | 60.7 | 59.6 | 54.8 | 56.1 | 52.45 |
| $Al_2O_3$ | 21.7 | 23.4 | 21.0 | 16.5 | 18.0 | 14.0 |
| $B_2O_3$ | 2.6 | 2.1 | 2.5 | 2.5 | 2.5 | 2.5 |
| $Na_2O$ | 9.1 | 7.1 | 9.0 | 18.0 | 15.0 | 23.0 |
| $MgO$ | 2.2 | 2.2 | 2.0 | 2.0 | 2.0 | 2.0 |
| $F$ | 2.2 | 2.2 | 2.0 | 2.0 | 2.0 | 2.0 |
| $CuO$ | 0.016 | 0.016 |  | 0.016 | 0.016 | 0.016 |
| $Ag$ | 0.11 | 0.54 | 0.35 | 0.35 | 0.20 | 0.20 |
| $CeO_2$ | 0.04 |  | 0.04 | 0.04 | 0.10 | 0.04 |
| $Sb_2O_3$ |  |  |  | 0.3 | 0.5 |  |
| $Li_2O$ | 3.6 | 3.7 | 3.5 | 3.5 | 3.5 | 3.5 |
| $Cl$ |  | 1.2 |  |  |  |  |
| $Br$ |  | 0.67 |  |  |  |  |

|  | 7 | 8 | 9 | 10 | 11 | 12 |
|---|---|---|---|---|---|---|
| $SiO_2$ | 52.35 | 52.15 | 54.25 | 52.27 | 52.23 | 52.21 |
| $Al_2O_3$ | 14.0 | 14.0 | 14.0 | 14.0 | 14.0 | 14.0 |
| $B_2O_3$ | 2.5 | 2.5 | 2.5 | 2.5 | 2.5 | 2.5 |
| $Na_2O$ | 18.0 | 18.0 | 18.0 | 18.0 | 18.0 | 18.0 |
| $MgO$ | 2.0 | 2.0 | 2.0 | 2.0 | 2.0 | 2.0 |
| $F$ | 2.0 | 2.0 | 2.0 | 2.0 | 2.0 | 2.0 |
| $CuO$ | 0.016 | 0.016 | 0.016 |  | 0.016 | 0.016 |
| $Ag$ | 0.30 | 0.50 | 0.40 | 0.40 | 0.40 | 0.40 |
| $CeO_2$ | 0.04 | 0.04 | 0.04 | 0.04 | 0.04 | 0.04 |
| $Li_2O$ | 8.5 | 8.5 | 8.5 | 8.5 | 8.5 | 8.5 |
| $CoO$ |  |  |  |  | 0.002 | 0.02 |
| $NiO$ |  |  |  |  | 0.004 | 0.04 |

|  | 13 | 14 | 15 | 16 | 17 | 18 |
|---|---|---|---|---|---|---|
| $SiO_2$ | 47.1 | 42.5 | 38.6 | 45.7 | 64.8 | 67.6 |
| $Al_2O_3$ | 23.8 | 19.5 | 24.7 | 17.7 | 12.0 | 7.0 |
| $B_2O_3$ | 10.7 | 6.5 | 13.5 | 9.2 | 12.2 | 14.0 |
| $Na_2O$ |  |  |  | 6.3 |  | 1.6 |
| $CuO$ | 0.005 | 0.01 | 0.015 | 0.018 | 0.02 | 0.01 |
| $Ag$ | 0.2 | 0.4 | 0.5 | 0.6 | 0.9 | 0.8 |
| $Li_2O$ |  | 5.8 | 18.7 | 3.2 |  | 2.5 |
| $K_2O$ | 17.2 | 21.3 |  | 21.3 | 2.5 | 3.1 |
| $BaO$ | 1.0 |  | 2.0 |  | 3.0 |  |
| $CaO$ |  | 3.0 |  | 5.0 | 1.0 | 1.0 |
| $ZnO$ | 1.0 | 1.0 | 3.0 |  |  | 4.0 |

|  | 19 | 20 | 21 | 22 | 23 | 24 |
|---|---|---|---|---|---|---|
| $SiO_2$ | 65.7 | 63.8 | 59.6 | 58.4 | 59.6 | 62.8 |
| $Al_2O_3$ |  |  | 21.4 | 14.5 | 11.1 | 7.8 |
| $B_2O_3$ | 8.9 | 9.7 |  |  |  |  |
| $Na_2O$ | 9.9 | 10.0 | 2.8 | 17.1 |  | 18.1 |
| $MgO$ | 3.4 | 4.2 | 3.2 | 3.2 | 4.6 |  |
| $CuO$ |  |  | 0.016 | 0.016 | 0.01 | 0.01 |
| $Ag$ | 0.2 | 0.4 | 0.5 | 0.4 | 0.6 | 0.7 |
| $Li_2O$ | 7.3 | 4.2 |  | 6.4 |  |  |
| $K_2O$ | 4.6 | 7.8 | 12.5 |  | 24.1 | 10.6 |
| $CoO$ | 0.005 | 0.002 |  | 0.003 |  | 0.002 |
| $NiO$ |  |  | 0.04 | 0.04 |  | 0.01 |

Melts of the above examples were cast into plates about 6″ x 8″ x ¼″ thick and then annealed. In each instance these plates were cooled to room temperature for visual inspection and testing for fluorescence. Table II records the heat treating schedules utilized in developing fluorescence in these examples. The ultraviolet exposure was provided by a General Electric Company UA 3,360 watt ultra-violet lamp which emits radiations of wave lengths between about 250–450 millimicrons. This lamp, producing strong radiations between about 280–340 millimicrons, was placed about 5″ from the plate. The plates were of sufficient thinness that they could be subjected to the desired temperature without gradually heating from room temperature. Likewise, after heat treating, the plates were removed directly into the air.

Table II also records the relative brightness level of fluorescence of these examples. Measurements of apparent brightness were made with a Photovolt Electronic Photometer model 501 M using phototube "E." The sample was activated while resting on the cell and ½ inch from a "Mineralight." This is a long-wave ultra-violet lamp having a 9-watt input emitting radiations between the wave lengths 310–460 millimicrons. The radiation from this source was filtered to remove wavelengths of visible light so that the only light activating the cell comes from the fluorescence. A reading of 10 is considered to be minimal for practical application of fluorescence.

TABLE II

| Example No. | Temperature, °C. | Dwell Time in Minutes | Fluorescence |
| --- | --- | --- | --- |
| 1 | 440 | 30 | 17 |
| 2 | 385 | 30 | 15 |
| 3 | 450 | 30 | 12 |
| 4 | 350 | 30 | 48 |
| 5 | 350 | 30 | 21 |
| 6 | 350 | 30 | 50 |
| 7 | 350 | 30 | 68 |
| 8 | 350 | 30 | 35 |
| 9 | 350 | 30 | 70 |
| 10 | 350 | 30 | 69 |
| 11 | 350 | 30 | 21 |
| 12 | 350 | 30 | 20 |
| 13 | 325 | 45 | 37 |
| 14 | 330 | 40 | 44 |
| 15 | 300 | 60 | 48 |
| 16 | 375 | 30 | 51 |
| 17 | 325 | 20 | 10 |
| 18 | 325 | 20 | 11 |
| 19 | 400 | 10 | 38 |
| 20 | 400 | 15 | 45 |
| 21 | 375 | 50 | 26 |
| 22 | 400 | 1 | 13 |
| 23 | 400 | 5 | 20 |
| 24 | 425 | 3 | 12 |

Table III records the brightness level of Examples 1–10 wherein ultra-violet radiations outside those specified in the invention were used in the heat treatment cycle while the temperature dwell time, and activating radiations were the same as set out in Table II.

TABLE III

| Example No. | Wave Length of Ultra-Violet Radiation | Fluorescence |
| --- | --- | --- |
| 1 | 270 | 3 |
| 2 | 270 | 3 |
| 3 | 270 | 2 |
| 4 | 270 | 7 |
| 5 | 270 | 4 |
| 6 | 350 | 7 |
| 7 | 350 | 8 |
| 8 | 350 | 6 |
| 9 | 350 | 9 |
| 10 | 350 | 9 |

Table IV records the brightness level of fluorescence of Examples 1–10 wherein ultra-violet radiations of shorter wave lengths than those specified in the invention were utilized in the activation step while the radiations in the heat treatment cycle and the temperature and dwell time thereof were the same as recorded in Table II. Radiations longer than about 400 millimicrons form part of the visible spectrum and, therefore, serve to mask the brightness of the fluorescene.

TABLE IV

| Example No. | Wave Length of Ultra-Violet Radiation | Fluorescence |
| --- | --- | --- |
| 1 | 290 | 3 |
| 2 | 290 | 2 |
| 3 | 290 | 1 |
| 4 | 290 | 7 |
| 5 | 290 | 4 |
| 6 | 275 | 6 |
| 7 | 275 | 7 |
| 8 | 275 | 5 |
| 9 | 275 | 8 |
| 10 | 275 | 8 |

A study of these tables reveals the criticality of the three factors which combine to produce the desired strong fluorescence. Thus, the proper nucleation and growth of colloidal silver particles are possible only through the simultaneous exposure to ultra-violet radiations of specific wave lengths and heat treatment within narrow temperature limits. And, strong fluorescence can be obtained only through activation utilizing ultra-violet radiations of the proper wave lengths. The use of ultra-violet light of longer wave lengths than 340 millimicrons or radiations shorter than 280 millimicrons in the heat treatment cycle results in weak fluorescence when exposed to radiations between 300–400 millimicrons. Likewise, weak fluorescence results where ultra-violet radiations shorter than about 300 millimicrons are employed to activate the body. A reading of Table II in combination with Table I serves to demonstrate that the brightness of the fluorescence is substantially directly proportional to the amount of alkali metal oxide present.

My invention has another advantageous feature which grows out of the method of producing the fluorescent glasses. A pattern of fluorescence can be incorporated in a glass body. This, then, permits a message or a decorative effect to be placed in the glass. Thus, a stencil which is impervious to ultra-violet radiations may be placed upon the glass body during the simultaneous exposure and heat treating step. In so doing, the portion masked by the stencil will not be nucleated by the ultra-violet radiation and therefore, will not fluoresce when exposed to the activating radiations. This preferential fluorescence has promoted the use of this glass for point-of-purchase advertising displays.

The following is a descripion of a mode of manufacture of the preferred embodiment of my invention, viz., Example 8. The batch ingredients were dry ballmilled together for one hour, placed in a closed crucible, and then melted at 1450° C. for six hours. The melt was then cast into a slab giving a sheet of glass 6″ x 8″ x ¼″ thick, and annealed at 450° C. The plate was then placed on a hot plate registering 350° C. and positioned five inches from a General Electric Company UA 3, 360 watt ultra-violet lamp. The plate was heated for 30 minutes while being subjected to ultra-violet radiations from the lamp. Thereafter, the plate was removed and allowed to cool to room temperature in the surrounding air.

The heat treatment of these glasses is effective below their annealing points so deformation of the shape can be avoided.

Silver ion exchange is well-known in the art as a method for introducing silver ions into the surface of an alkali-containing glass. Indeed, the decorating and marking of glass articles by silver staining has been utilized for many years while, more recently, the ion exchange of silver for alkali metals, particularly sodium, has been employed in developing photochromic glasses containing silver halide crystals and also in the chemical strengthening of glass articles where the relatively large silver ion is "crowded" into the surface of the glass in replacing the smaller alkali metal ion originally therein.

This exchange process is recognized as being time-temperature dependent. Hence, a very slow exchange can be induced at temperatures as low as about 200° C. but much more rapid exchanges take place as the temperature thereof is raised. In the production of photochromic glasses, temperatures ranging from about 100° C. below the strain point of the glass to about 100° C. above the softening point thereof are generally utilized. At temperatures approaching and exceeding the softening point of the glass are employed, deformation of the article is hazarded but the rate of exchange becomes so rapid that a few minutes at such temperatures will yield the same depth of exchange as a few hours at a lower temperature. In the chemical strengthening of glass by the "crowding" technique, however, temperatures below the strain point of the glass are used so that the compression layer caused by the crowding will not be relaxed.

I have discovered that fluorescent images can be made in a relatively shallow surface layer utilizing the ion exchange technique. Thus, silver ions are introduced into the surface of glass articles composed of the compositions disclosed hereinabove, but essentially free of silver, by contacting the glass surface with a material containing silver or silver compounds. This is accomplished in the known manner by utilizing either the salt bath or silver paste method wherein the exchange occurs upon the application of heat. After the silver ions have migrated into the glass and exchanged for alkali metal ions, the simultaneous exposure to radiations between about 280 and 340 millimicrons and heat treatment thereof will produce the fluorescent image. Generally, surface depth of at least about ½ mil is necessary to assure strong fluorescence. Since chemical strengthening of the glass is not the primary purpose of the invention, the exchange process can be conducted over the wide range of temperatures cited above with respect to the development of photochromic glass, the only requirement being that the exchange take place for a sufficient length of time to effect the replacement of the alkali metal ions with silver ions. To enhance the migration of silver ions into the glass article, the article can be heated for a period of time at temperatures ranging from about 150° C. below the strain point of the glass to a temperature between the strain point and the softening point of the glass. Of course, where chemical strengthening is also desired, the exchange and any heat treatment must be undertaken at temperatures below the strain point of the glass.

Nevertheless, although the technique of silver ion exchange is well-recognized in the glass and ceramic arts, the following examples are given to demonstrate the practical effectiveness of the method in the instant invention.

*Example 25*

A batch for a glass having the composition, as calculated from the batch in weight percent, of 60.5% $SiO_2$, 20.5% $Al_2O_3$, 2.5% $B_2O_3$, 9% $Na_2O$, 2% $MgO$, 3.5% $Li_2O$, 2% F, 0.016% CuO, and 0.04% $CeO_2$ was melted in a platinum crucible for six hours at 1500° C. The melt was rolled into sheet of ⅜″ thickness and annealed at 520° C. The sheet was immersed in a molten salt bath of $AgNO_3$ operating at 375° C. and maintained therein for 20 minutes. The sheet was removed from the bath and the salt washed off with water. Thereafter, the sheet was simultaneously exposed to the UA 3 ultra-violet lamp described above and held at 350° C. for a period of 30 minutes.

The irradiated sheet was then tested for fluorescence utilizing the "Mineralight" described above. A fluorescence reading of 18 was obtained with the photometer employed above.

*Example 26*

A sheet of the same glass as described in Example 25 was immersed in the molten bath of $AgNO_3$ operating at 375° C. but maintained therein for only two minutes. After removal of the sheet from the bath and the clinging salt washed off with water, the sheet was heated to 650° C. and held thereat for 30 minutes. Thereafter the sheet was heated and irradiated in a like manner to that described in Example 25.

The irradiated sheet was tested for fluorescence following the procedure set out in Example 25 and a reading of 14 was obtained with the photometer.

Thus, these examples clearly illustrate that fluorescent images can be made in the glasses of this invention wherein the silver is incorporated into the glass through the well-known ion exchange technique.

I claim:
1. A method for making a glass exhibiting strong fluorescence when subjected to ultra-violet radiations of wave lengths ranging from about 300–400 millimicrons which comprises melting a glass-forming batch consisting essentially, in weight percent as calculated from the batch, of about 35–70% $SiO_2$, 3–29% $R_2O$, wherein $R_2O$ consists of the sum of 0–20% $Li_2O$, 0–25% $Na_2O$, and 0–25% $K_2O$, and 0.2–1.0% Ag, cooling the melt to a glass and shaping a body therefrom, and thereafter simultaneously exposing said glass body to ultra-violet radiation of wave lengths ranging from about 280–340 millimicrons and subjecting said body to a temperature between about 300°–450° C. for about 1–60 minutes.

2. A glass exhibiting strong fluorescence when subjected to ultra-violet radiations of wave lengths ranging from about 300–400 millimicrons made in accordance with the method of claim 1.

3. A method for making a glass exhibiting strong fluorescence when subjected to ultra-violet radiations of wave lengths ranging from about 300–400 millimicrons which comprises melting an essentially silver-free glass-forming batch consisting essentially, in weight percent as calculated from the batch, of about 35–70% $SiO_2$ and 3–29% $R_2O$, wherein $R_2O$ consists of the sum of 0–20% $Li_2O$, 0–25% $Na_2O$, and 0–25% $K_2O$, cooling the melt to a glass and shaping a body therefrom, thereafter contacting the surface of said glass body with a material containing an exchangeable silver ion at a temperature ranging from about 100° C. below the strain point of the glass to about 100° C. above the softening point of the glass for a period of time sufficient to effect the exchange of silver ions for alkali metal ions in at least the surface of the glass body, and then simultaneously exposing said glass body to ultra-violet radiations of wave lengths ranging from about 280–340 millimicrons and subjected said body to a temperature between about 300°–450° C. for about 1–60 minutes.

4. A glass exhibiting strong fluorescence when subjected to ultra-violet radiations of wave lengths ranging from about 300–400 millimicrons made in accordance with the method of claim 3.

References Cited

UNITED STATES PATENTS

| | | | |
|---|---|---|---|
| 1,855,799 | 4/1932 | Hassell | 252—301.4 |
| 2,344,250 | 3/1944 | Jones | 161—196 |
| 2,440,048 | 4/1948 | Hood | 106—52 |
| 2,515,936 | 7/1950 | Armistead | 65—33 |
| 2,515,940 | 7/1950 | Stookey | 65—33 |
| 2,515,943 | 7/1950 | Stookey | 65—33 |
| 2,684,911 | 7/1954 | Stookey | 65—33 |
| 2,971,853 | 2/1961 | Stookey | 106—52 |
| 3,197,296 | 7/1965 | Eppler et al. | 106—52 |
| 3,278,319 | 10/1966 | Cohen | 106—52 |

DONALL H. SYLVESTER, *Primary Examiner.*

G. R. MYERS, *Assistant Examiner.*